G. LAUB.
ILLUMINATING DEVICE FOR LICENSE PLATES.
APPLICATION FILED MAR. 14, 1914.
1,135,822.
Patented Apr. 13, 1915.
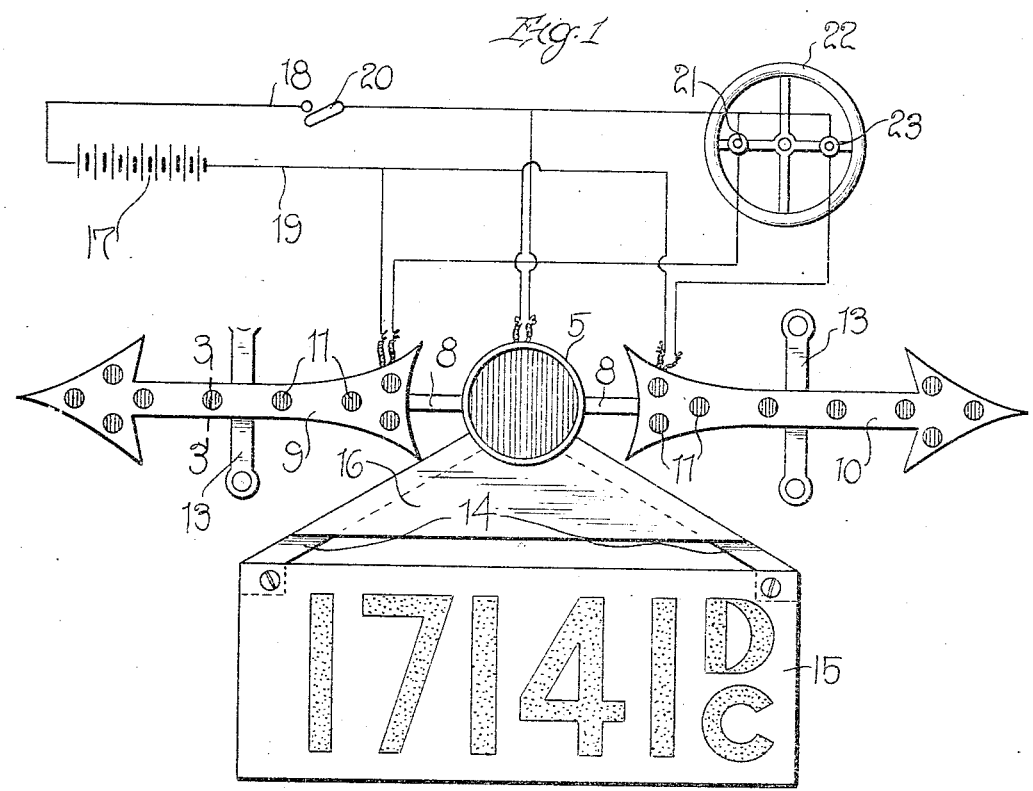
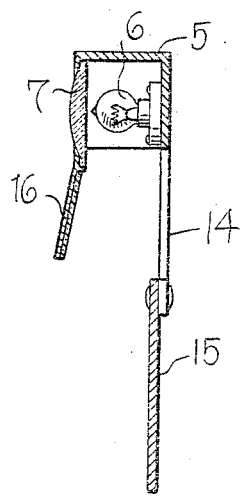
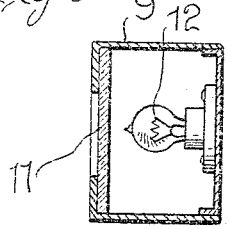
Inventor
G. LAUB
By Watson E. Coleman
Attorney
Witnesses
Robert M. Sutphen
A. L. Hind

UNITED STATES PATENT OFFICE.

GEORGE LAUB, OF CLEVELAND, OHIO.

ILLUMINATING DEVICE FOR LICENSE-PLATES.

1,135,822.  Specification of Letters Patent.  Patented Apr. 13, 1915.

Application filed March 14, 1914. Serial No. 824,742.

*To all whom it may concern:*

Be it known that I, GEORGE LAUB, a citizen of the United States, residing at Cleveland, in the county of Cuyahoga and State of Ohio, have invented certain new and useful Improvements in Illuminating Devices for License-Plates, of which the following is a specification, reference being had to the accompanying drawings.

This invention relates to improvements in automobile attachments, and particularly to means for supporting and illuminating the rear end license plate of the automobile.

The object of my invention is the provision of very simple means for supporting the rear end license plate of an automobile in conjunction with the tail lamp of the vehicle, provision being made whereby the light of the tail lamp shall be reflected upon the license plate so as to fully illuminate the latter, the construction being such, however, as will not obstruct in any manner the tail light.

With these and other objects in view, my invention consists in the novel construction, combination, and arrangement of parts to be hereinafter more fully described, claimed, and illustrated in the accompanying drawings, in which—

Figure 1 is an elevation of my device showing a diagrammatic view of the electrical connections therefor. Fig. 2 is a vertical section. Fig. 3 is a section on the line 3—3 of Fig. 1.

Referring more particularly to the drawing, the numeral 5 designates a lamp casing, which is provided with a lamp 6 arranged therein, the casing having an open outer wall and bottom. Mounted in the open outer wall of the casing is a lens 7 which is preferably composed of red glass, so that the lamp 6 serves as the rear or tail light for the vehicle. Extending from the opposite sides of the casing 5 are arms 8, to the free ends of which are connected outwardly extending arrow shaped signals or casings 9 and 10. The casings 9 and 10 are provided in their outer walls with a plurality of openings in which red lenses 11 are also mounted, the casings having a plurality of lamps 12 arranged therein, preferably rearwardly of the lenses 11. Extending from the upper and lower walls of the casings 9 and 10 are brackets 13 by means of which the device may be secured to the body of an automobile or similar vehicle (not shown). Extending downwardly from the inner end of the casing 5 are a pair of diverging supporting arms 14, the lower ends of which are apertured for connection to a license plate 15, so that the rays of light projecting from the open bottom of the casing 5, strike the plate to illuminate the same. To divert a part of the rays of the lamp 6 to the license plate, a reflector plate 16 depends from the outer end of the casing 5 as clearly illustrated in Fig. 2 of the drawing, so that the license plate will be brightly illuminated. The reflector plate is outwardly and downwardly inclined so that the rays of light striking thereon will be reflected downward and rearward. It will further be seen that the reflector is so formed that the entire surface of the license plate is illuminated. This is because the reflector is transversely flat and not curved. If the reflector were curved the middle portion of the license plate would be most brilliantly illuminated and the marginal portions of the license plate would be only relatively slightly illuminated. Furthermore, it is to be noted that the reflector is entirely below the outside of the space inclosed by the lateral wall 5 of the lamp casing, so that there is no obstruction to the lens 7. Thus the tail light not only fully performs its functions as a tail light, but also fully illuminates the license plate.

The electrical connections comprise besides a lamp 6 and the lamps 12, a battery 17 and the circuit wires 18 and 19, which extend from the positive and negative poles of the battery. The lamp 6 and the lamps 12 are connected in multiple with the circuit wires 18 and 19, and a cut-out switch 20 is provided to open and close the circuit connecting the battery and the lamps. As shown in the diagrammatic view of the wiring in Fig. 1 of the drawing, the lamp 6 is always in circuit with the battery 17 when the switch 20 is closed, so that the lamp is always lighted, while the circuit connecting the battery and the lamps 12 within the casing 9, is normally open, and may be closed by a button switch 21 which is connected to the steering wheel 22 of the automobile or other similar vehicle (not shown). The circuit connecting the battery 17 with the lamps 12 within the casing 10, is also normally open, and is closed by a button switch 23 which is also mounted upon the steering wheel 22.

The operation of the device is as follows:

As long as the operator of the vehicle drives straight ahead, the circuits connecting the battery with the casings 9 and 10 are allowed to remain open, so that only the tail light 6 is visible. When the operator approaches a corner at which he intends to turn, he depresses one of the button switches 21 and 23, according to the direction in which he is about to turn, so that the corresponding signal 9 or 10 is illuminated to indicate to vehicles following of his intention to turn the corner in a direction to which the illuminated signal points. After the vehicle has turned the corner, the operator may remove the pressure from the button switch 21 or 23, which has been operated, so that the lamps contained within the signal which has been lighted are again extinguished to allow only the tail light 6 to remain visible.

It will be seen that in a device constructed in accordance with my invention, that all danger of rear end collisions of vehicles traveling in the same direction is obviated, as the driver of the vehicle in the rear of the one in which the operator thereof intends to turn a corner is warned of that intention by the illumination of the signals as the foremost vehicle approaches the corner.

From the above description, taken in connection with the accompanying drawing, it will be seen that my device provides an improved signaling means for motor vehicles or the like, which also serves as a tail light for the vehicle, and as a license tag carrier, the rays of the tail light being utilized to illuminate the license tag.

Having thus fully described my invention, what I claim as new and desire to secure by Letters Patent is:

In a vehicle, the combination with a lamp casing having an open bottom, of a lens mounted in the front wall of the casing, supporting arms extending downward and outward from the rear end of the casing, a license plate carried upon the lower ends of the arms, a downwardly extending forwardly inclined reflector depending from the front end of the lamp casing and entirely below the lateral wall of the casing and adapted to reflect rays from a lamp disposed within the casing downward upon said license plate, without in any way obstructing the passage of other rays through the lens, said reflector being transversely flat and gradually increasing in width from its upper to its lower end, the lower edge of the reflector extending in a horizontal plane parallel to but above the upper edge of the license plate.

In testimony whereof I hereunto affix my signature in the presence of two witnesses.

GEORGE LAUB.

Witnesses:
 ESTELL TERRIS,
 WM. F. WALTERS.